Nov. 10, 1970           L. K. HAHN           3,539,808
MEASURING CORROSION ON A COATED METALLIC SURFACE BY MEANS
OF BACK-SCATTERED NUCLEAR RADIATION
Filed April 22, 1966           2 Sheets-Sheet 1

Linus K. Hahn
INVENTOR

BY William T. Fryer III
ATTORNEY

Linus K. Hahn
INVENTOR

BY William T. Fryer III
ATTORNEY

United States Patent Office 3,539,808
Patented Nov. 10, 1970

3,539,808
MEASURING CORROSION ON A COATED METALLIC SURFACE BY MEANS OF BACKSCATTERED NUCLEAR RADIATION
Linus K. Hahn, Columbus, Ohio, assignor to Industrial Nucleonics Corporation, a corporation of Ohio
Filed Apr. 22, 1966, Ser. No. 544,458
Int. Cl. G01n 23/00
U.S. Cl. 250—83.3                        4 Claims

ABSTRACT OF THE DISCLOSURE

In one form the present invention relates to the measurement of corrosion on a metallic surface protected by a cover, such as paint. According to one of the methods, the corrosion is detected by the steps of irradiating the protected member with beta nuclear radiation having an energy range that presents a substantially infinite thickness response from the metallic member, measuring the backscatter radiation from the protected member, and correlating the backscatter measurement with the thickness of the corrosion. The apparatus for scanning a member utilizes a number of apertures in a collimator, and a source means, so arranged that the source successively scans along the same direction on the protected member. A circular arrangement of apertures, some offset, can be used with two sources rotating with a support arm, to provide the continuous scan along the same direction.

---

The present invention relates to the measurement of a property of a material and, specifically, the method and apparatus for improving the measuring accuracy and speed. The apparatus and method is described with reference to the measurement of corrosion on a metallic member surface protected by a cover, such as paint, but it is apparent that some features disclosed herein can be applied to other types of property measurement.

NEED FOR THE INVENTION

Corrosion is a significant cause of permanent defects in metal parts, unless detected early. Quite often the protective coating, such as paint, hides the corrosion from the human eye, and it is only after the corrosion is severe that it is detected. For this reason, many devices are painted routinely, even when not needed, to prevent the undetected formation of corrosion.

OBJECTS

It is an object of the present invention to provide an improved property measuring apparatus and method.

It is a further object of the present invention to provide a method for detecting corrosion early, before it is visible to the human eye.

It is a further object of the present invention to provide an apparatus that scans a member surface along a predetermined direction.

It is another object of the present invention to provide an apparatus that scans a protected metallic member for corrosion and indicates how much corrosion is present and where it is located.

BRIEF DESCRIPTION

The present invention accomplishes these objects by utilizing a unique combination of features. Briefly, the method of corrosion detection includes the steps of irradiating the protected member with beta nuclear radiation having an energy range that presents a substantially infinite thickness response from the metallic member, measuring the backscatter radiation from the protected member, and correlating the backscatter measurement with the thickness of the corrosion.

The apparatus for scanning a member utilizes a number of apertures in a collimator, and a source means, so arranged that the source successively scans along the same direction on the protected member. A circular arrangement of apertures, some offset, can be used with two sources rotating with a support arm, to provide the continuous scan along the same direction. The corrosion detection device utilizes the scanning arrangement to locate the corrosion.

FIGURES

Figure 1:
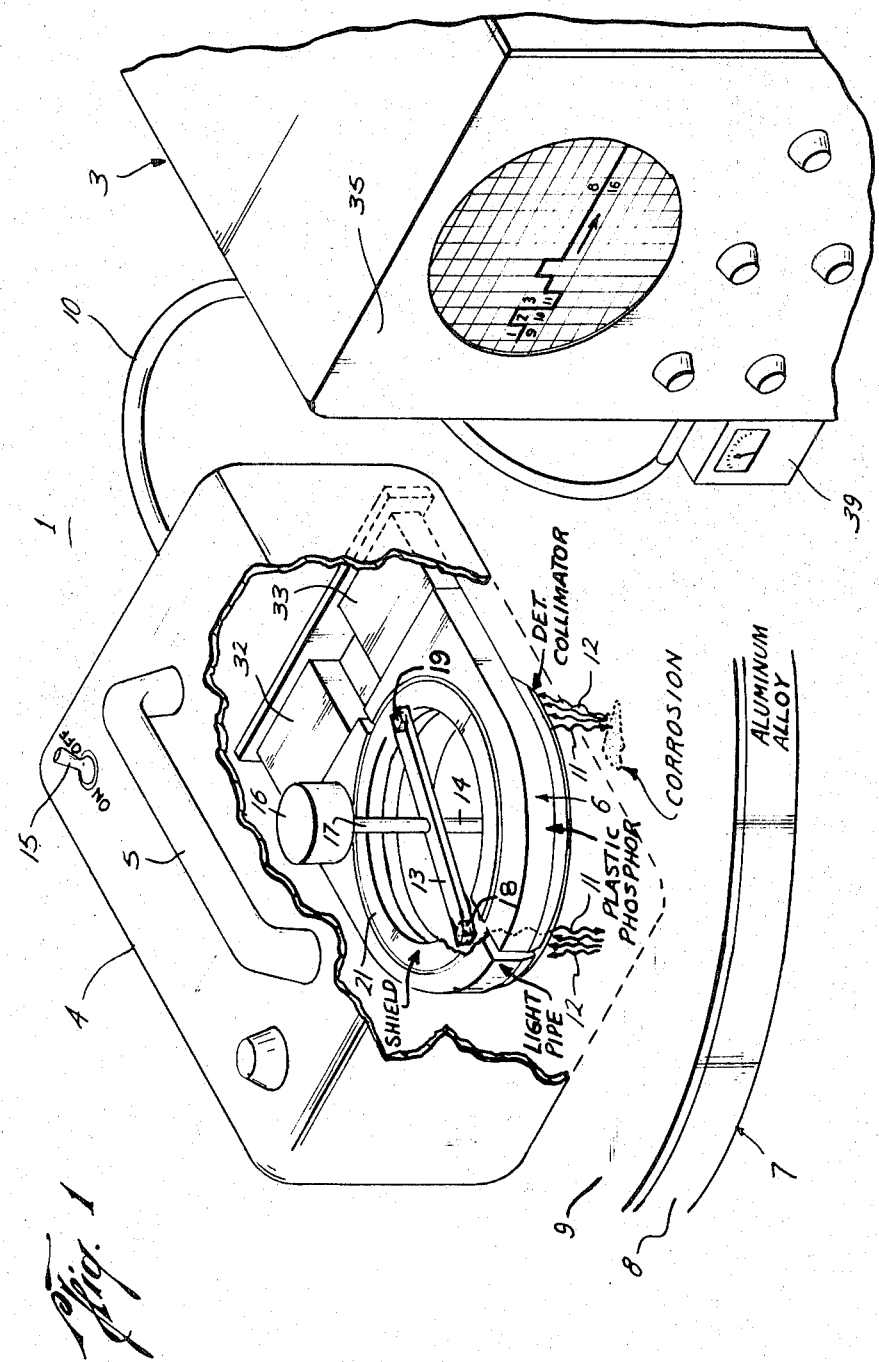
Figure 2:
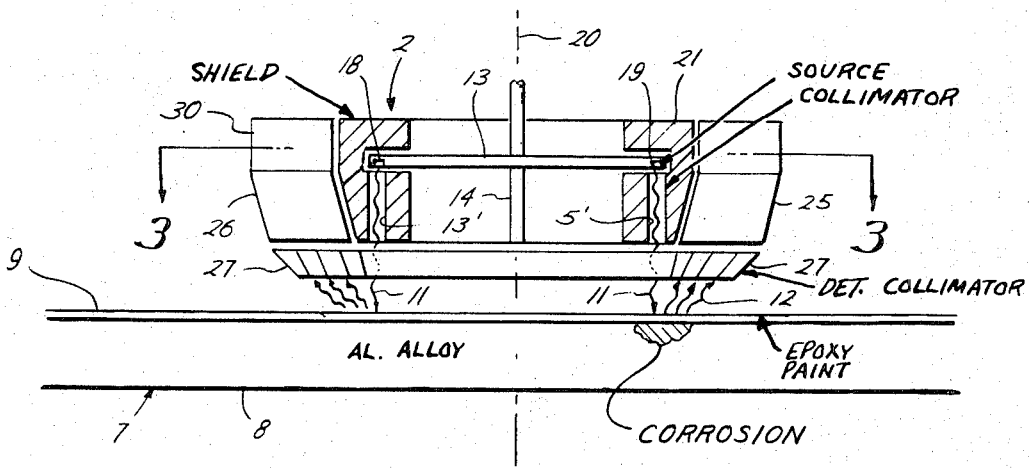
Figure 3:
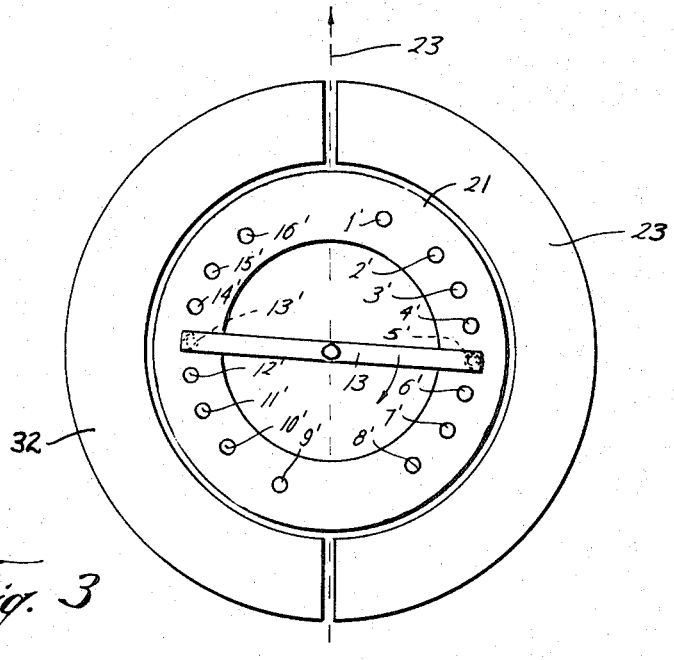

In the figures:
FIG. 1 is a perspective view of one embodiment of a corrosion detection system in operation, in accordance with the present invention.
FIG. 2 is an elevation view, in section, of the corrosion detection head shown in FIG. 1.
FIG. 3 is a plan view, in section, along the lines 3—3 of FIG. 2.

MEASUREMENT OF CORROSION

It has been found that backscatter nuclear radiation can be used to measure corrosion with reasonable accuracy. The example chosen was the measurement of the corrosion of an aluminum alloy with an epoxy paint covering, and a beta radiation source of Strontium–90. It was found that the effective atomic number of the epoxy paint was very close to the corrosion effective atomic number of the corrosion. Changes in the paint thickness from 1 mil to 2 mils caused negligibly small effect on the backscatter radiation. A curve of corrosion thickness versus backscatter radiation intensity was obtained for a range of 1.06 mils to 8.48 mils of corrosion, assuming the corrosion density to be 3.7 gm./cm.$^3$.

The nuclear source selected, SR–90/Y$_t$–90, had a beta energy range that produced saturation response (substantially no backscatter radiation change) for changes in the thickness of the aluminum above about 40 mils. With this relationship and a substantially uniform paint thickness, the backscatter radiation was responsive primarily to corrosion thickness. Even with some change in the paint thickness, the close effective atomic numbers of the paint and the corrosion, created only an insignificant error, for practical purposes.

APPARATUS—IN GENERAL

One embodiment of apparatus for scanning a member for a property, such as corrosion is illustrated. The detection system 1 arrangement includes a detector head 2 and indicator 3.

Detector head 2 is arranged to respond to the changes in corrosion thickness and indicator 3 identifies its magnitude and locates its position.

Detector head 2 includes a housing 4 with suitable carrying means, such as handle 5, and within a source and detector assembly 6. The detector head 2 rests on the protected member 7, including an aluminum alloy base 8 covered by an epoxy paint 9.

In general, the function of detector head 2 is to provide electrical signals that are coupled through cable 10 to indicator 3. The electrical signals are generated by the source-detector assembly 6 through the irradiation of the member 7 with nuclear radiation, such as beta radiation represented by arrows 11, and the detection of the backscatter radiation represented by arrows 12. With the aluminum alloy thickness large enough for the beta radiation energy to produce saturation response to thickness changes, and a fairly uniform coating thickness of paint 9, the backscatter radiation intensity will be primarily a function of the corrosion, if any. Initially, the system 1 would be calibrated for various corrosion thicknesses, using samples of the member 7 prepared for this purpose. Indicator 3, which can be any electrical signal indicating device, would have a scale marked off in units of corrosion thickness.

APPARATUS—EMBODIMENT DISCLOSED

The source-detector assembly 6 is uniquely suited to scanning a member for a property. The detector head 2 need not be moved, even as the member surface is scanned in one direction to locate the property change. The location of the property can be very precise and, in combination with suitable indicator 3, the property can be pictured in a two-dimensional display showing the area which has the property and the relative magnitudes in that area.

The source part of source-detector assembly 6 within housing 4 is supported on arm 13, arranged for rotational movement about its center, axis 20 (FIG. 2) on a support 14. Arm 13 is driven for continuous rotation in one direction, when switch 15 is on, by a motor (not shown) contained in motor housing 16. Motor housing is supported from the top of housing 4, by suitable fasteners (not shown) and the motor within has a drive shaft 17 coupled to arm 13 to provide the rotational drive.

On opposite ends of arm 13 are nuclear radiation sources 18 and 19 such as beta source Strontium-90, each source properly encapsulated and mounted to radiate a narrow beam of radiation downwardly, as viewed in FIG. 1 and FIG. 2. Sources 18 and 19 are positioned at equal distances from the axis of rotation of arm 13, thereby followng the path of a circle centered on axis 20.

Concentric with axis 20 is disposed an annular collimator 21 for the nuclear radiation used (FIG. 3). Collinmator 21 substantially surrounds arm 13 adjacent the sources 18 and 19, shielding the operation from the radiation. But the narrow beam 11 of radiation passes through apertures 13' and 5' to irradiate member 7. Other apertures 1'-16' are disposed on a circle about axis 20, centered on the same circle as sources 18 and 19 fall. As arm 13 rotates, beams 11 simultaneously pass through apertures diametrically opposed on the circle.

The arrangement of the sources 18 and 19 and apertures 16'-16' is chosen to produce a continuous scan along one direction across member 7. Apertures 1'-8' are uniformly spaced along one half of the circle. Each of apertures 9'-16' is off-set, between a pair of apertures 1'-8'. The effect of this arrangement is to have the sources 18 and 19 irradiate areas that include substantially all the surface along the direction of arrow 23 under the detector head 2. In other words, the apertures 1'-16' projected on a plane formed by axis 20 and arrow 23 would be substantially a continuous series of apertures, one beginning where the next leaves off. The result is that, by the rotational scanning of sources 18 and 19 each area in direction 23 is scanned for corrosion.

The detector part of source-detector assembly 6 is positioned to pick up only the backscatter radiation 12 from member 7 (FIG. 2). Around collimator 21 is disposed two sections 25 and 26 including a semi-circular plastic phosphor, suitably mounted, or another type of detector, such as a Geiger Muller tube. The backscatter radiation 12 passes through concentric rings of detector collimators 27 that focus the detected radiation from a region adjacent the irradiated region. Detector section 25 receives the backscatter radiation produced from one-half of the rotation of sources 18 and 19 and detector 26 receives the other part. The backscatter radiation is converted to light, as is well known, and transmitted through light pipes 30 and 31, respectively, for detector sections 26 and 25, and then to photomultipliers 32 and 33, respectively, that produce an electrical signal proportional to the amplitude of the light intensity.

INDICATOR

The indicator 3 is coupled to receive the outputs from photomultipliers 32 and 33 and the circuit subtracts these signals to indicate the difference. The display means can take several forms, such as an oscilloscope 35 which has the difference signal coupled to the vertical deflection control and a horizontal sweep that is synchronized to repeat the horizontal sweep for each one-half revolution of arm 13. As shown, the horizontal position across the scope face represents position along the direction of arrow 23. When there is corrosion in one location and not the other, a difference signal will be produced with the amplitude direction indicating which locality, whether through aperture 1' or 9'. By observing the scope, the operator knows the corrosion picture. Even if there is no difference, with corrosion present all over member 7 (a small chance) the presence of corrosion can be detected by independently measuring the amplitude of one of the photomultiplier signals. A significant decrease, due to corrosion will be apparent. This indication can be readout on meter 39 coupled to receive one of the signals from photomultipiers 32 or 33.

MODIFICATIONS AND ALTERATIVE EMBODIMENTS

The apparatus shown herein, by way of illustration, can be modified without departing from the invention. These changes can include mechanical layout, dimensions, types of nuclear source, detection means, and indicator means. The method of the invention can be practiced by various forms of apparatus. Accordingly, it is the scope of the appended claims coupled with these changes that form the extent of the protection for the invention.

I claim:

1. Apparatus for detecting corrosion in a predetermined direction on a metallic member surface covered by a protective coating, such as paint, comprising:
   a first source of nuclear radiation,
   a second source of nuclear radiation,
   a support member supporting said first and second sources at opposite ends,
   means for rotatably supporting said support member about its center,
   a collimator for said radiation having a number of apertures disposed on a circle about the center of said support member, so that rotation of said support member causes said sources to align with diametrically opposite apertures in said collimator to irradiate said surface with nuclear radiation at the selected locations,
   a first detector means having a configuration that surrounds a portion of the path of said rotatable member for receiving only backscatter radiation from the irradiated locations,
   a second detector means having a configuration that surrounds another portion of the path of said rotatable member for receiving only backscatter radiation from said irradiated locations, and
   means coupled to both said detector means for comparing the received backscatter radiation.

2. Apparatus, as described in claim 1, wherein said comparing means is an indicator that displays the difference between the backscatter radiation intensity received by both said detector means in relation to the position of said rotatable member thereby indicating the position of said corrosion.

3. Apparatus for scanning a member surface in a predetermined direction for a property, comprising:
   means providing a source of radiation,
   a collimator for said radiation, said collimator having a number of radiation transmitting apertures, some offset and arranged so that a projection of the apertures on a plane perpendicular to the surface to be scanned will provide a substantially continuous coverage in said predetermined direction, and
   means for positioning said source over said apertures successively to provide a substantially continuous movement of said source radiation along said predetermined direction.

4. Apparatus, as described in claim 3, wherein said apertures are disposed on a circle and spaced to provide substantially continuous coverage in said predetermined direction, said source means comprising first and second sources disposed on a rotatable arm pivotally mounted at the center of said circle and extending to said apertures, said source means and aperture spacing being so arranged that when said first source is irradiating a location on said surface, said second source irradiates an adjacent location along said predetermined direction, and the same relationship continues as said arm rotates around said circle to successive aperture positions.

References Cited

UNITED STATES PATENTS 3,399,303  8/1968  Berk _____ 250—83.3

ARCHIE R. BORCHELT, Primary Examiner

250—105, 106